United States Patent [19]

Hubbard

[11] 4,252,336
[45] Feb. 24, 1981

[54] TRAILER TURNTABLE LOCKING APPARATUS

[76] Inventor: Rufus L. Hubbard, 2613 Iowa Ave., Modesto, Calif. 95351

[21] Appl. No.: 57,292

[22] Filed: Jul. 13, 1979

[51] Int. Cl.³ .............................................. B62D 53/08
[52] U.S. Cl. .................................... 280/432; 280/474
[58] Field of Search ........... 280/433, 432, 474, 446 B, 280/448, DIG. 14

[56] References Cited

U.S. PATENT DOCUMENTS

| | | | |
|---|---|---|---|
| 2,330,897 | 10/1943 | Kirksey | 280/432 |
| 4,161,329 | 7/1979 | Pilz | 280/432 X |

FOREIGN PATENT DOCUMENTS 1219280  1/1971  United Kingdom ..................... 280/432

*Primary Examiner*—John A. Pekar

[57] ABSTRACT

A trucktrailer turntable locking apparatus mounted on a tractor or trailer dolly frame is described in which at least one locking bar hinged on a cross frame member of the tractor or dolly frame is pivoted by an air ram into a locking position such that the respective ends of the bar will abut against the longitudinal side frame struts of the trailer bed proximate the turntable as the trailer articulates on the turntable thereby locking the respective frames of the tractor or dolly and trailer in longitudinal alignment. For added strength, the locking bar may be mounted on the cross frame member such that its respective ends also abut against the longitudinal side frames of the tractor or dolly when in the locking position. In the preferred embodiment two locking bars are provided fore and aft the trailer turntable.

13 Claims, 4 Drawing Figures

TRAILER TURNTABLE LOCKING APPARATUS

BACKGROUND OF THE INVENTION

This invention relates to an apparatus mounted on a tractor or trailer dolly for locking a towed-trailer in rigid longitudinal alignment with the tractor or dolly frame.

Trailers in the trucking industry typically include two longitudinal side frame struts on which the trailer bed is secured. The rear axle and wheels are rigidly secured in perpendicular relationship to the trailer frame. The front end of the trailer is usually supported either by a "fifth wheel" assembly of a tractor (semi-trailer) or a front axle dolly and wheels secured to the trailer frame through a turntable assembly (full trailer). In either case, the front end of the trailer articulates about the vertical axis of either the "fifth wheel" of the tractor or the turntable of the front axle dolly. During braking maneuvers, or when operating on slippery roads or when backing such semi- and full trailers, the trailer may articulate sharply, and in most cases unexpectedly, about the vertical axis of the fifth wheel or turntable, a phenomenon popularly termed "jackknifing".

Prevention of jackknifing is a frequently addressed problem in the trucking industry. For example, U.S. Pat. Nos. 4,067,592, 3,774,941, 3,556,560, 3,101,959, and 2,499,013 each describe friction breaking devices in combination with "fifth wheel" and/or trailer turntable assemblies. The theory behind the friction breaking devices is to increase resistance to articulation of the trailer about the vertical axis or the fifth wheel or turntable apparatus during maneuvers likely to induce jackknifing. However, as pointed out in U.S. Pat. No. 3,774,941 it is impractical to assume that a frictional breaking device can prevent jackknifing because of the tremendous loads involved. Specifically, the trailer bed itself effectively provides a very long lever arm relative to the vertical axis of the fifth wheel, a factor which favors jackknifing, whereas the breaking mechanisms have an effectively short lever arm for resisting articulation of the trailer about the vertical axis.

Under dynamic load conditions, with a fully loaded trailer, such frictional breaking devices simply cannot prevent a trailer from articulating relative to the tractor or front axle dolly.

In fact, where a loaded trailer is more massive than the tractor or the front axle dolly the problem is not to prevent articulation of the trailer relative to the tractor or front axle dolly, but rather to prevent the tractor or front axle dolly from articulating relative to the trailer.

In less dynamic load conditions such as those experienced in backing conditions, again the mechanical advantage provided by the trailer bed is sufficiently great to overcome any resistance to jackknifing provided by breaking mechanisms.

Finally, frictional breaking mechanisms contemplate substantial modification of most fifth wheel and turntable assemblies and accordingly cannot be adapted to existing fifth wheel and turntable assemblies.

Another approach to prevent jackknifing is suggested in U.S. Pat. Nos. 3,031,205 and 2,468,705 in which mechanical latches mounted on the tractor or dolly frame lock into openings provided in the apron plate of the trailer to prevent articulation of the trailer. The disadvantage of such latch mechanisms as suggested relate first to the lack of strength in the latching mechanisms and second to the fact that registry is required between the latch and the receiving receptacle in the apron plate of the trailer. Specifically, the latch and supporting structures must be extremely strong to be able to resist the tremendous mechanical advantage of the trailer bed under dynamic load conditions. Also, because the latches must engage corresponding apertures in the apron plate of the trailer registry between the aperture and locking lug is required. Finally, the mechanical locking mechanism suggested in the latter references may effectively lock only after the tractor and trailer are in a "jackknife" position.

SUMMARY OF THE INVENTION

An apparatus for locking a trailer having longitudinal side frame struts and a tractor or front axle dolly frame in longitudinal alignment is described wherein at least one locking bar hinged to a cross frame strut of the tractor or front axle dolly is swung from an unlocked position between the side frames of the tractor or dolly upwardly to an engaged position between the longitudinal side frame struts of the trailer such that the respective ends of the bar will abut against the longitudinal side struts of the trailer to prevent the trailer from articulating about the vertical axis of a fifth wheel or turntable apparatus of a tractor or front axle, respectively.

Alternatively, the locking bars could be hinged to a cross frame member of the trailer and swung downwardly from an unlocked position between the side frames of the trailer to an engaged position between the side frame members of the tractor or front axle dolly such that the respective ends of the locking bar will engage the side frames of the tractor or dolly to prevent articulation of the trailer or dolly about the vertical axis of the fifth wheel or turntable assembly of the tractor or dolly, respectively.

For additional strength, the ends of the locking bar when swung into the engaged position may be located such that the respective ends engage the side frame of both the trailer and the tractor or front axle dolly. Two locking bars located fore and aft the fifth wheel or turntable provide cantilevered rigidity when engaged to prevent articulation of the trailer and tractor or front axle dolly about the vertical axis of the fifth wheel or turntable, respectively.

Additionally, the length of the locking bars can be selected so as to allow some articulation of the trailer about the vertical axis of the fifth wheel or turntable. Also, inclined abutment blocks may be secured to the longitudinal side struts of the trailer so that an operator may control the degree of articulation between a tractor or front axle dolly and a trailer by varying the engagement position of the locking bar.

DESCRIPTION OF PREFERRED EMBODIMENTS

Figure 1:
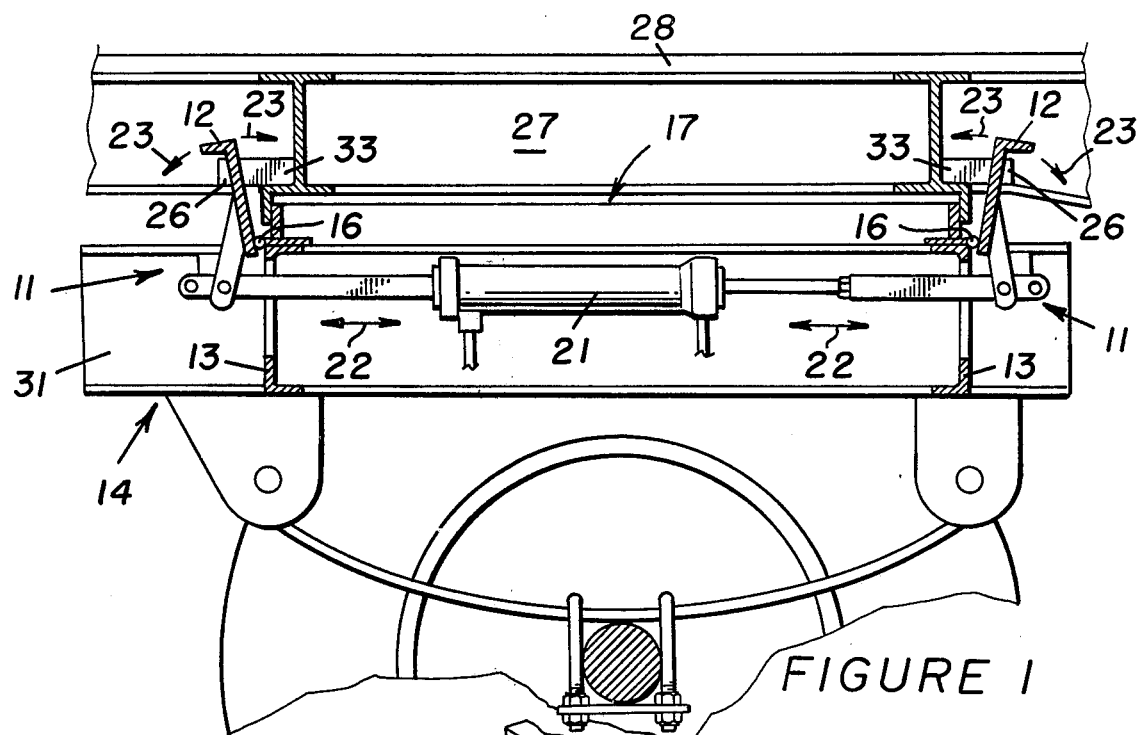
FIG. 1 is a partial side elevation view of the frame components of a trailer and a front axle dolly or tractor showing the installment of the Turntable Locking Apparatus in accordance with the invention.
Figure 2:
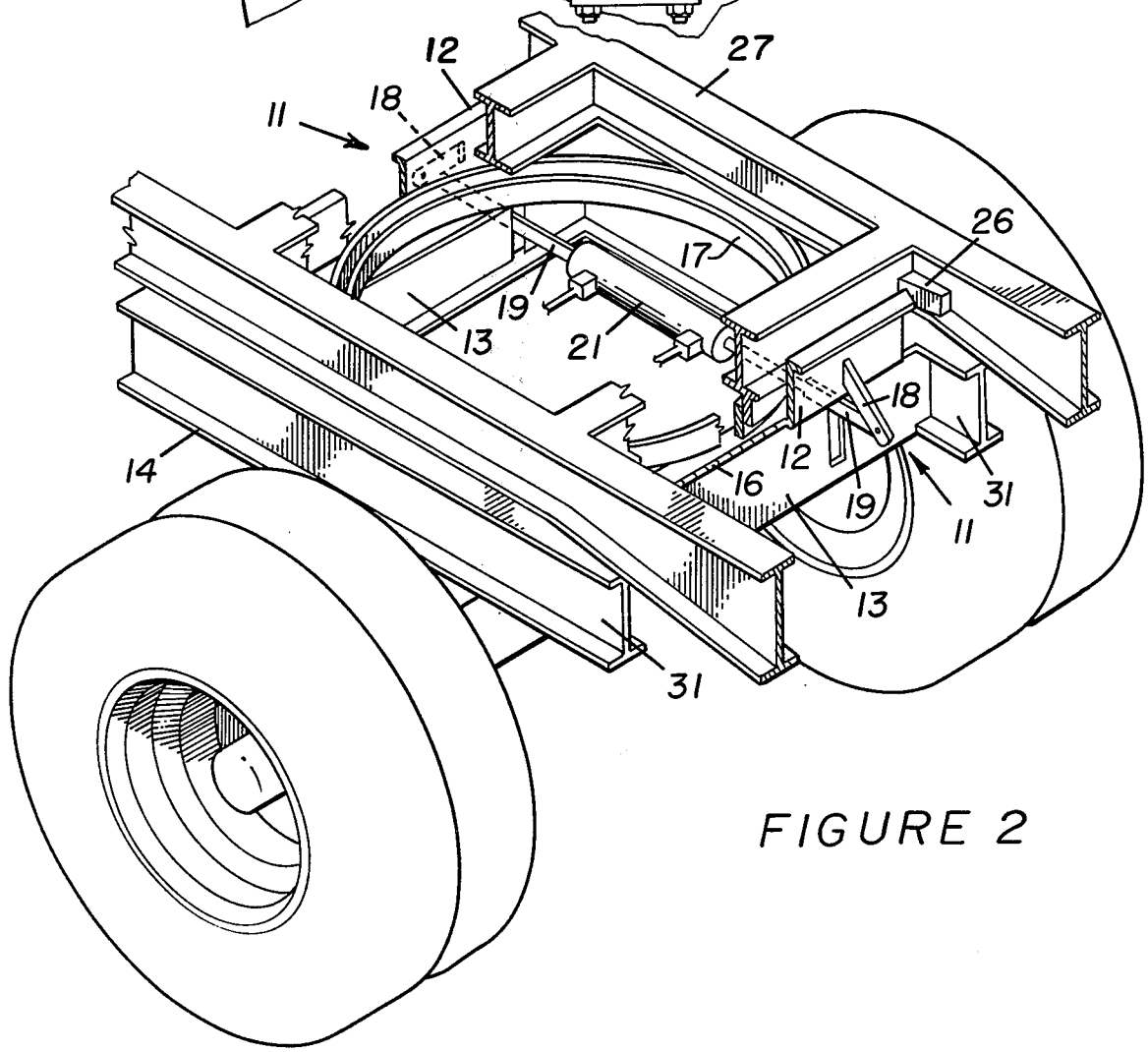
FIG. 2 is a perspective view of the frame components of a trailer and a front axle dolly or tractor showing the invented Turntable Locking Apparatus.

Referring to FIGS. 1 and 2, the invented Turntable Locking Apparatus 11 includes 2 locking bars 12 secured to cross frame members 13 of a front axle dolly or tractor 14 by hinges 16 fore and aft the turntable or fifth wheel coupling assembly 17. The structural details of the turntable or fifth wheel coupling assembly 17 are not depicted. Lever arms 18 integrally secured to the locking bars 12 angle outwardly from the plane of the locking bars 12. The lever arms 18 are adapted to be secured to the respective shafts 19 of a double acting air ram 21 mounted on the front axle dolly or tractor 14. As the air ram 21 extends and retracts as shown by arrows 22, the locking bars 12 are rotated inwardly and upwardly and outwardly and downwardly respectively as shown by the arrows 23. When the air ram 21 is fully retracted, the locking bars lie in an approximate horizontal (unlocked) position so as to not interfere with coupling of the trailer to the dolly or tractor 14. When the air ram is extended, the locking bars 12 rotate upwardly on the hinges 16 to an approximately vertical (engaged) position (see FIG. 2) such that the ends of the bars abut against abuttment blocks 26 secured to the longitudinal side frame struts 27 on either side of the trailer bed 28.

When the locking bars 12 are in the engaged position, the trailer bed 28 is prevented from articulating about the vertical axis of the turntable or fifth wheel coupling assembly 17. Specifically, the locking bars 12 effectively secure the respective frames of the trailer bed 28 and the front axle dolly or tractor in longitudinal alignment and convert the turntable coupling assembly or fifth wheel coupling assembly 17 between the trailer and front axle dolly or tractor 14 from an articulating assembly to a simple coupling which cooperates with the locking bars 12 to enhance the rigidity of the longitudinally aligned connection between the frames of the dolly or tractor 14 and the trailer bed 28.

In particular, when the locking bars 12 are swung upwardly into the engaged position fore and aft the turntable or fifth wheel coupling assembly 17 between the side frame struts 27 of the trailer bed 28, the respective ends of the locking bars become the ostensible pivot points between the dolly or tractor frame 14 and the trailer bed 28. However, in order to pivot about the ends of the locking bars, the coupling provided by the turntable or fifth wheel assembly 17 must move transversely. Typically turntable and fifth wheel coupling assemblies of the trailer and dolly or tractors are capable of withstanding considerable transverse stresses. In fact, most turntable assemblies of trailers are directly mounted and secured to the frame structure of the trailer as are the cooperating turntable assemblies of front axle dollies and fifth wheel assemblies of tractors.

More importantly, when the locking bars 12 are rotated into the engaged position, they provide cantilevered support to prevent articulation between the respective frames of the trailer bed 28 and the front axle dolly or tractor 14. The turntable or fifth wheel coupling assemblies 17 enhance the rigidity of the cantilevered coupling between the respective frames of the trailer bed 28 and front axle dolly or tractor 14 provided by the locking bars 12, in essence becoming the mechanical equivalent of an additional cross frame member securing the respective frames of the trailer and dolly or tractor in longitudinal alignment.

Retraction and expansion of the air ram 21 can be accomplished by conventional pneumatic means with the controls appropriately located such that the operator may engage the turntable locking apparatus under a circumstance where there is a danger of "jackknifing".

Figures 3, 4:
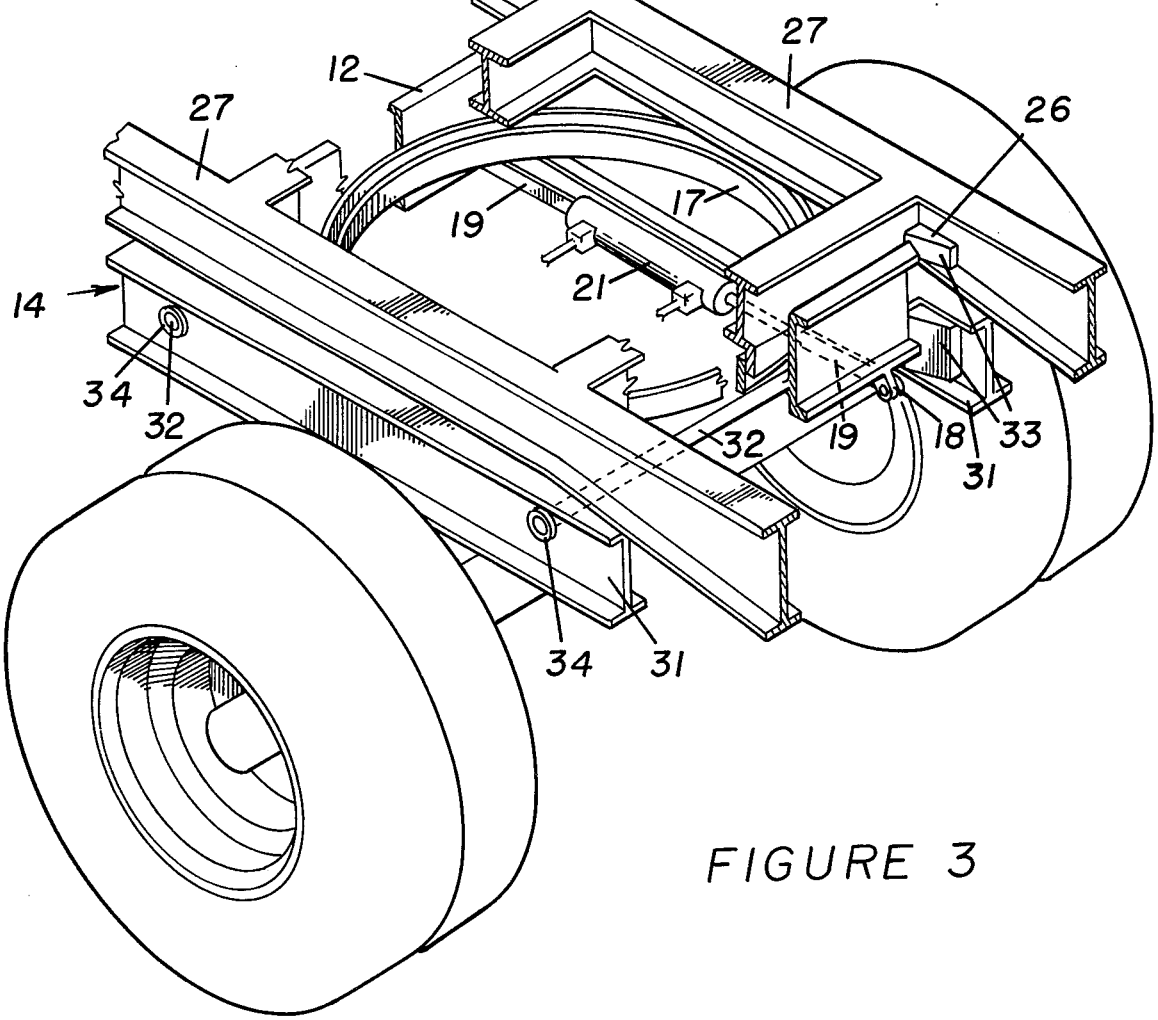
FIG. 3 is a perspective view of the frame components of a trailer and a front axle dolly and/or tractor showing engagement of the invented Turntable Locking Apparatus between the respective frames of the trailer and the front axle dolly and/or tractor.
FIG. 4 is an enlarged perspective view of the circled section of FIG. 2.

Referring now to FIG. 3, the rigidity and strength of the cantilevered support provided by the locking bars 12 can be enhanced by increasing the width of the locking bar such that the respective ends in addition to abutting against the abutment blocks 26 secured to the longitudinal side frame struts 27 of the trailer bed 28, also abut against abutment blocks 29 secured to the longitudinal side frame members 31 of the front axle dolly or tractor 14. In this latter embodiment, rather than securing the locking bars 12 to a cross frame member 13 of the dolly or tractor 14, the locking bars 12 are supported perpendicularly between the longitudinal side frames 31 of the dolly or tractor 14 by integral cylindrical shafts 32 received in bearing journals 34 secured to the side frames of the dolly. The extending shafts 19 of the air ram 21 would be secured to lever arms 18 integrally secured to the bottom sides of the locking bars 12. When the air ram is retracted, the locking bars 12 rotate about the longitudinal axis provided by the shafts 32 and bearings 34 to an unlocked position where they do not interfere with coupling or decoupling the trailer bed 28 from the front axle dolly or tractor 14 and the trailer may pivot about the vertical axis provided by the coupling assembly. When the air ram 21 is expanded the locking bars 12 rotate into a locking position such that the bar extends between the respective side frames 27 of the trailer bed 28 and the longitudinal side frames 31 of the dolly or tractor 14. In the embodiment shown in FIG. 3, cylindrical shafts 32 and bearings 34 need not have structural strength to withstand sheer stress whereas the hinge couplings 16 between the locking bar 12 in the embodiment shown in FIGS. 1 and 2 need have structural strength to withstand sheer stresses. Specifically, in the embodiment shown in FIGS. 1 and 2 the hinges 16 bear the load of the coupling between the frame of the dolly or tractor 14 and the frame of the trailer bed 28 when the locking bars 12 are in the engaged position. In contrast, in the embodiment shown in FIG. 3, the locking bar itself provides the mechanical coupling between the respective frames of the trailer bed 28 and dolly or tractor 14 and the cylindrical shafts 32 and bearings 34 simply hold the locking bar in a perpendicular orientation between the side frames 31 and 27 of the dolly or tractor 14 and trailer 28 respectively.

Referring now to FIG. 4, the abutment surface 33 of the abutment blocks 26 secured to the longitudinal side frame struts 27 on each side of the trailer bed 28 may be inclined such that an operator may regulate the degree of allowable articulation between a tractor or front axle dolly 14 and trailer 28 by varying the engagement position of the locking bars 12. Specifically, the air ram 21 may be controlled by conventional means such that in addition to the fully retracted position it may have three or more extended positions. For example, assuming the air ram 21 has three extended positions, as it is extended from the retracted position to extended position 1 the locking bars 12 are rotated to locking position 1 such that the trailer may articulate up to 10 degrees before the inclined surface of the abutment blocks 26 abut against one or another of the ends of the locking bars 26 fore and aft the turntable or fifth wheel coupling assembly 17. When the air ram 21 is extended to position 2 and the locking bars 12 rotated further inwardly and upwardly, then the trailer bed may articulate from 4 to 6 degrees before the face of the abutment blocks 26 engages the respective ends of the locking bars 12 fore and aft the turntable or fifth wheel coupling assembly 17. When the air ram 21 is extended to position 3 rotating the locking bars 12 upwardly and inwardly to position 3 then the trailer bed may only articulate 1 to 2 degrees before the abutment blocks abut against the respective ends of the locking bars 12.

Alternatively, in applications where it is desirable to allow some degree of articulation between the trailer 28 and dolly or tractor 14, but an air ram 21 having multiple extended positions is not feasible, then the length of the locking bars 12 may be selected such that the trailer bed may articulate 1, 2 or up to 6 degrees before the abutment blocks 26 engage the respective ends of the locking bars 12. In this manner a severe jacknife can be prevented and yet allow some articulation about the vertical axis of the turntable or fifth wheel coupling assembly 17 sufficient for operation under circumstances where sharp turns are not anticipated and there is a danger of jackknifing, such as on a relatively straight but slippery road.

While the invented Turntable Locking Apparatus is described with respect to exemplary, representative, and schematic embodiments, it should be apparent that numerous variations and modifications can be effected within the spirit and the scope of the invention as described herein and as defined and set forth in the appended claims.

I claim:

1. A locking apparatus for preventing articulation of a towed trailer about a vertical axis provided by an articulating coupling assembly coupling the trailer proximate its front end to a towing means comprising in combination,
    a locking bar pivotally mounted perpendicularly between two parallel and horizontal frame members of the towing means, said locking bar adapted to pivot about a longitudinal axis to a locking position extending perpendicularly between two parallel and horizontal frame struts of the trailer where its respective ends abut against the respective parallel and horizontal struts of the trailer,
    means for pivoting the locking bar to and from the locking position.

2. In a tractor including two parallel and horizontal side frame members and a fifth wheel coupling assembly mounted between the side frame members for towing trailers having two parallel and horizontal side frame struts and a complementary fifth wheel coupling assembly located between said parallel side frame struts proximate its front end of such that the trailer, when coupled to the tractor, articulates about a vertical axis provided by the fifth wheel coupling assembly of the tractor and trailer, a locking apparatus comprising in combination therewith,
    at least one locking bar pivotally mounted perpendicularly between the side frame members of the tractor, said locking bar adapted to pivot about a longitudinal axis from an unlocked position where said bar extends between and below the parallel side frame struts of the trailer to a locked position where said bar extends perpendicularly between the parallel side frame struts of the trailer with its respective ends abutting against the side frame struts of the trailer, whereby said trailer is able to articulate about the vertical axis provided by the fifth wheel coupling assembly of the tractor and trailer when said locking bar is in said unlocked position, and one or the other ends of said locking bar abutting against one or the other of the parallel side frame struts of the trailer bed preventing said trailer from articulating about the vertical axis provided by the fifth wheel coupling assembly of the tractor and trailer when said locking bar is in the locking position.

3. The locking apparatus of claim 2 further including means for pivoting said locking bar from the unlocked position to the locked position.

4. In a front axle dolly including two parallel and horizontal side frame members, and a turntable coupling assembly mounted between the side frame members for towing trailers having two parallel and horizontal side frame struts and a complementary coupling assembly proximate its front end located between the side frame struts adapted for coupling to the turntable assembly of said front axle dolly such that the trailer may articulate about a vertical axis provided by the turntable coupling assembly, a locking apparatus comprising in combination therewith,
    a locking bar pivotally mounted and oriented perpendicularly between the side frame members of the dolly,
    means for pivoting the locking bar about a longitudinal axis from an unlocked position extending perpendicularly between and below the side frame struts of the trailer enabling the trailer to articulate about the vertical axis provided by the turntable coupling assembly of the trailer and dolly, to a locking position extending perpendicularly between the parallel side frame struts of the trailer where the respective ends of the locking bar abutting against the respective side frame struts prevent the trailer from articulating about the vertical axis provided by the turntable coupling assembly of the trailer and dolly.

5. The locking apparatus of claims 1, 3 or 4 further including an additional locking bar pivotally mounted perpendicularly between the parallel and horizontal frame members of the towing means, said additional locking bar adapted to pivot about a longitudinal axis to a locking position extending perpendicularly between the parallel and horizontal frame struts of the trailer with its respective ends abutting against the respective parallel frame struts of the trailer and wherein said means for pivoting said locking bar to and from the locking position also pivots said additional locking bar to and from the locking position.

6. A locking apparatus of claim 5 wherein said locking bar is pivotally mounted perpendicularly between the parallel frame members of the towing means immediately in front of the articulating coupling assembly and said additional locking bar is pivotally mounted perpendicularly between the parallel frame members of the towing means immediately behind the articulating coupling assembly.

7. The locking apparatus of claim 5 wherein one of said locking bars is pivotally mounted on a cross frame member of the towing means immediately in front of the articulating coupling assembly and the other locking bar is pivotally mounted on a cross frame member of the towing means immediately behind the articulating coupling assembly.

8. The locking apparatus of claims 1, 3 or 4 wherein said locking bar in the locking position, also extends perpendicularly between the parallel and horizontal frame members of the towing means with its respective ends also abutting against the respective frame members of the towing means.

9. A locking apparatus of claim 5 further including a plurality of abutment blocks secured to the two parallel horizontal frame struts of the trailer located such that each end of a locking bar abuts against a corresponding abutment block when said locking bars are positioned in the locking position.

10. The locking apparatus of claim 9 wherein said abutment blocks have inclined abutment surfaces and wherein said means for pivoting said locking bars to and from the locking position includes means for adjusting the locking position of the locking bars whereby an operator of the towing means may limit articulation of the trailer relative to the towing means by varying the locking position of the respective locking bars relative to the inclined surfaces of the abutment blocks.

11. The locking apparatus of claim 5 wherein the lengths of the locking bars are selected to allow the trailer to pivot about the vertical axis provided by the articulating coupling assembly a maximum of 12 degrees when said locking bars are in the locking position before a frame strut of the trailer will abut against one or the other of the ends of said locking bars whereby said trailer may pivot 6 degrees in either direction from longitudinal alignment with the towing means.

12. A locking apparatus for preventing articulation of a towed trailer about a vertical axis of an articulating coupling assembly coupling the trailer proximate its front end to a towing means, comprising in combination,
a locking bar pivotally mounted perpendicularly between two parallel and horizontal frame struts of the trailer proximate the coupling assembly, said locking bar adapted to pivot about a longitudinal axis to a locking position perpendicularly between two parallel and horizontal frame members of the towing means where its respective ends abut against the respective parallel frames of the towing means,
means for pivoting the locking bar to and from the locking position.

13. A locking apparatus for preventing articulation of a towed trailer about a vertical axis of an articulating coupling assembly coupling the trailer at its front end to a towing means, comprising in combination,
a locking bar movably secured and extending perpendicularly between two parallel and horizontal frame members of the towing means,
means for mechanically moving said locking bar from an unlocked position extending between the frame members of the towing means to a locked position extending perpendicularly between two parallel and horizontal frame struts of the trailer where its respective ends abut against the respective parallel frame struts of the trailer.

* * * * *